United States Patent Office 3,359,285
Patented Dec. 19, 1967

3,359,285
PRODUCTION OF CYCLIC ADDITION PRODUCTS
Phillip S. Landis, Woodbury, N.J., assignor to Mobil Oil Corporation, a corporation of New York
No Drawing. Filed July 3, 1963, Ser. No. 292,726
28 Claims. (Cl. 260—346.6)

This invention relates to the production of cyclic addition products in the presence of an alumino-silicate having unique catalytic activity and in particular to the production of hydro-aromatic compounds and/or derivatives thereof from the addition of unsaturated compounds with conjugated dienes in the presence of such alumino-silicate catalysts.

This invention contemplates production of compounds containing a six membered hydro-aromatic ring and/or derivatives thereof in the presence of a catalyst prepared from naturally occurring or synthetic alumino-silicates having active cation sites within an ordered internal structure. These cation sites are formed by the presence of certain exchangeable metal and/or hydrogen cations ionically bonded or chemisorbed within the ordered internal structure of the alumino-silicate; preferably, certain alumino-silicates having a high concentration of active hydrogen sites formed within their ordered internal structure. In addition, this invention concerns a process for effecting reaction between a conjugated diene and a Diels-Alder type dienophile under certain operating conditions in the presence of the heretofore described catalyst. Furthermore, this invention is directed to the production of Diels-Alder type adducts and/or derivatives thereof by effecting reaction between conjugated dienes and unsaturated carbonyl compounds, e.g., acids, esters, anhydrides, aldehydes, ketones, and the like, in the presence of the aforementioned catalyst.

In accordance with this invention, it has been found that reactions involving a Diels-Alder mechanism can be catalyzed to produce improved yields of cyclic addition products (Diels-Alder adducts and/or derivatives thereof) in the presence of an alumino-silicate which has exchangeable metal and/or hydrogen cations chemisorbed or ionically bonded within an ordered internal structure. In addition, it has been found that certain other reactions (i.e., isomerization, dehydrogenation, aromatization, hydration and the like) may be effected subsequently to the formation of the addition products to produce certain other derivative compounds while in the presence of the alumino-silicate catalyst.

Advantageously, these reaction may be conducted with or without a solvent diluent medium in either a liquid vapor or mixed vapor-liquid phase over a relatively wide range of operating temperatures. Because of the unique catalytic activity of the alumino-silicates and the variety of operating conditions, several outstanding results are obtained by the process of the invention and many of the problems heretofore attendant to the Diels-Alder reaction mechanism may be eliminated or substantially reduced.

One significant result of this process is that improved yields of Diels-Alder adducts can be obtained by controlling the occurrence of side reactions which may run concomitantly with the Diels-Alder reaction and which may decrease the yield of adduct products. These interfering reactions may include polymerization of the diene, polymerization of the dienophile, secondary coupling of an additional mole of either the diene or the dienophile to the primary adduct, degradation of bridge systems, and the like reactions.

It will be appreciated that polymerization of the reactants may result from operation at the elevated temperatures which are often necessary to promote the Diels-Alder reaction, whereas lack of process control, use of certain solvents, or presence of impurities, will cause the other interfering reactions.

Advantageously, the alumino-silicate catalyst of this invention can promote the Diels-Alder reactions at relatively low temperatures with or without a solvent diluent so that the polymerization reactions are substantially eliminated or greatly reduced. It will be appreciated that when dienophiles which are solid at room temperature are employed, a solvent may be required to serve as a reaction medium. In addition, it has been found that the order in which the reactants are contacted with the alumino-silicate catalyst also affects these polymerization reactions. Thus, presaturation of the catalyst with the dienophile or with an inert solvent prior to introduction of the conjugated dienes further reduces the polymerization of the dienes.

Furthermore, because the activity of the catalyst is dependent upon the alumino-silicate used, a desired level of activity can be produced to suit the requirements of a specific reaction. Certain catalysts promote some Diels-Alder reactions without causing secondary reactions such as the additional coupling of either a diene or a dienophile to the primary adducts, whereas other catalysts are less selective for production of the adducts.

It is believed that the extent to which these secondary and other such reactions occur is dependent on the activity of the alumino-silicate catalyst and the operating conditions employed as well as the reactivity of the dienes and dienophiles. Apparently, the Diels-Alder reactions between less reactive dienes and dienophiles are effectively promoted by catalysts having a high concentration of hydrogen sites within an ordered internal structure under mild operating conditions, while the addition reactions between more reactive compounds is controlled best with catalysts having a low concentration of hydrogen sites, i.e., alumino-silicates containing a major proportion of cations of the alkali metals and alkaline earth metals.

A further advantageous result achieved by the present process is that the exceptionally long reaction periods which are usually required by the Diels-Alder reaction mechanism are substantially shortened in the presence of certain alumino-silicate catalysts. Reactions which apparently could not be economically effected are now possible to complete within a relatively short duration of time. It will be appreciated that as heretofore described, these slow unreactive systems are promoted by the catalysts having a high concentration of acid sites within an ordered internal structure.

A variety of unsaturated compounds may serve as the dienophile in the process of this invention. These dienophiles include unsaturated acyclic, alicyclic and cyclic compounds which contain a double or a triple bond that is usually conjugated with one or more unsaturated groups, i.e., the additional unsaturation is in the $\alpha,\beta$-position. Among these unsaturated compounds are carbonyl compounds, e.g., acids, esters, anhydrides, aldehydes, ketones, lactones, and the like, as well as nitriles, nitroso compounds and sulfones. In addition, inner anhydrides such as maleic anhydride and other such ring compounds formed by the abstraction of water from a dicarboxylic acid, are particularly effective as dienophiles.

Exemplary of some of the unsaturated compounds which may be used are those represented by the following general formulae:

(1) 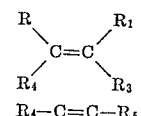

(2) 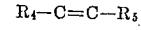

wherein R represents hydrogen, an alkyl group, or a phenyl group; $R_1$ represents —CHO, —$CO_2H$, —$CO_2R$, —COX, —COR, —CN, —$NO_2$, —$SO_2R$, —$CH_2X$, —$CH_2CN$, —$CH_2OX$, —$CH_2NH_2$, —$CH_2NCS$, —OCOR, —X (X being a halogen such as Cl or Br), —OR, —SR, and hydrogen; $R_2$ and $R_3$ also represent a carboxylic acid anhydride grouping; $R_4$ represents —CHO, —$CO_2H$, —CN, —$CO_2R$, —COR, —X, —R, and hydrogen and $R_5$ represent —CHO, —$CO_2H$, —$CO_2R$, —COR, —CN and hydrogen. In general, these compounds contain from 2 to 20 carbons per molecule; those containing from 2 to 15 being preferred. It will be appreciated that in some instances, compounds containing an isolated double bond such as ethylene may be employed but usually more severe operating conditions are required. In addition, the ethylenic dienophiles (those containing double bonds) provide greater yields than analogous acetylenes, and bifunctional dienophiles (those compounds having more than one group conjugated with the primary unsaturated bond such as the quinone) are more reactive than the unifunctional dienophile. In accordance with this invention, the $\alpha,\beta$-unsaturated carbonyl compounds such as acrylic acid, sorbic acid, acrolein, cyclopentene-1-aldehyde, maleic anhydride, and the like, are the preferred dienophiles.

Advantageously, many conjugated dienes may be used to form the Diels-Alder adducts in the presence of the alumino-silicate catalyst. The dienes may be acyclic, alicyclic, alicyclic-acyclic, bicyclic, aromatic, acyclic-aromatic or heterocyclic compounds. In general, these conjugated dienes contain from 4 to 20 carbon atoms per molecule; preferably, the compounds contain from 4 to 15 carbon atoms. Exemplary of these conjugated dienes are butadiene, methylbutadiene, cyclopentadiene, 1-vinylcyclohexene, 1 - vinyl-3,4 - dihydronaphthalenes, bicyclohexenyl, anthracene, 1-vinylnaphthalene, furan, 2-methylfuran and the like compounds and homologs thereof.

It will be appreciated that the reactivity of the acyclic conjugated dienes is dependent more on the position of the substituent groups rather than the size of the groups. Substituents such as alkyl, alkoxyl, and aryl groups on the second carbon atom or on the second and the third carbon atoms of an acyclic chain, usually improve the reactivity of the diene, but substitution of these groups on to the terminal carbon atoms reduces the reactivity. Accordingly, 2,3-dimethylbutadiene is more reactive than butadiene, whereas butadiene is more reactive than 2,4-hexadiene. Generally, this order of reactivity also holds true for aryl substituted acyclic conjugated dienes. However, those conjugated dienes of the five- and six-carbon ring systems are exceptionally reactive and are substantially unaffected by increased substitution. It will also be appreciated that acyclic-aromatic compounds and the heterocyclic compounds such as furans which are substantially less reactive than the other conjugated dienes have been included as possible reactants because these compounds have been found to possess increased reactivity in the presence of the catalysts of this invention.

In general, the Diels-Alder adducts produced by the present process contain a six-membered hydro-aromatic ring having one or more unsaturated bonds formed by the equimolar addition of a conjugated diene and a dienophile. Depending on the choice of catalyst, the addends reacted, and the reaction conditions employed, these cyclohexenes may be carbonyl compounds, sulfones, nitroso compounds, nitriles, or the like compounds, which have mono- or poly-cyclic configurations. In addition, one or more bridge systems may be present within these ring configurations. For example, reaction between maleic anhydride and furan by the process of this invention provides improved yields of a compound having a bridge system across a six-membered unsaturated ring and a closed anhydride moiety attached thereto, i.e., 3,6-endoxo-1,2,3,6-tetrahydrophthalic anhydride. The preferred adducts of this invention are the carbonyl compounds, i.e., the acids, the esters, the anhydrides, the aldehydes, and the like compounds.

It will be appreciated that in certain instances it may be desirable to produce derivatives of the Diels-Alder adducts by effecting subsequent reaction of the adduct while it is still in the presence of the alumino-silicate catalyst. Thus, the adducts classically formed by a Diels-Alder reaction mechanism serve as intermediate compounds that may or may not be isolated prior to further reactions over the catalysts of this invention. Some of the reactions which may be effected simultaneously with the formation of the adducts include isomerization (i.e., involving relocation of the unsaturated bonds within the molecular moiety of the adduct) skeletal rearrangement or isomerization, dehydrogenation, hydrogenation, aromatization, disproportionation, dehydrocyclization, hydration or hydrolysis, and the like. Among the adduct derivatives formed by such reactions are isomeric cyclopentenes and cyclohexanes, mercaptans, esters, ethers, aromatic compounds, cyclohexanes and the like.

In general, formation of isomers that have relocated unsaturated bonds within the adduct moiety occur in the presence of alumino-silicate catalysts containing alkali or alkaline earth metal cations at higher temperatures and longer contact times (low space velocities) than required for production of the simple addition product. Likewise, skeletal rearrangement or isomerization of the adducts may be brought about under similar elevated temperatures and low space velocities in the presence of aluminosilicate catalysts having a high concentration of hydrogen sites within an ordered internal structure.

Hydration or hydrolysis reactions are carried out by the introduction of other reactants such as $H_2O$, $H_2S$, $CO_2$, $SO_2$ and the like, to the diene and/or dienophile reactants in the presence of the catalysts having a high concentration of hydrogen sites within their crystalline structure. Thus, adducts containing an aldehyde group may be reacted with hydrogen sulfide to form the corresponding mercaptans (thiol groups) or with water to form the corresponding alcohols (hydroxy groups).

In addition, conversion of the six-membered hydro-aromatic adduct to aromatic compounds may be effected by inclusion of other catalytic components such as platinum metals, e.g., platinum, palladium and the like, within the alumino-silicate catalysts, with or without use of a hydrogen atmosphere. Usually dehydrogenation to the equivalent aromatic is brought about at relatively higher temperatures, whereas hydrogenation to a mixture of aromatic and cyclohexane products is accomplished at lower temperatures in the presence of a hydrogen atmosphere. Thus, dehydrogenation of the adduct produced by reaction of 1,4-naphthoquinone and 2,3 dimethyl-1,3 butadiene may be effected to form 2,3-dimethylanthraquinone. Also, indene and butadiene may be condensed to form a polycyclic adduct that upon dehydrogenation forms fluorene.

Accordingly, it will be appreciated that the process of this invention provides many varied and useful routes to the formation of cyclic addition products and their derivatives through use of a Diels-Alder reaction mechanism. Also, the adducts so produced may be recovered as primary products or employed as intermediate reactants for other desirable products.

In accordance with this invention, catalysts having active cation sites within an ordered internal structure produced by alkali metal or alkaline earth metal cations may be prepared directly from naturally occurring or synthetic alumino-silicates, whereas acid catalysts having a high concentration of hydrogen sites are prepared by base exchange of the alumino-silicates with certain metal and/or hydrogen cations.

Advantageously, the alumino-silicate catalysts having a high concentration of active hydrogen sites suitable to the purpose of this invention, may be prepared from a variety of naturally occurring or synthetic alumino-silicates. These alumino-silicates have exchangeable metal cations, i.e., alkali metals and alkaline earth metals which may be completely or partially replaced by conventional base exchanging with certain other metal cations and/or hydrogen cations.

Although some alumino-silicates may be base exchanged with hydrogen cations to form effective catalysts for this invention, other alumino-silicates such as the synthetic alumino-silicate, zeolite X, are not stable to direct base exchange with hydrogen cations or are not structurally or thermally stable after a portion of their exchangeable metal cations have been replaced with hydrogen cations. Thus, it is often necessary to exchange other metal cations with these alumino-silicates to achieve the necessary stability within the ordered internal structure prior to the inclusion of the hydrogen cations. It has been determined that the alumino-silicates having at least 0.5 milliequivalent of hydrogen per gram of solid and preferably above about 0.75 milliequivalent of hydrogen per gram of solid provide effective acid catalysts for the purposes of this invention. It will be understood that this value indicates the total concentration of hydrogen cations present within an alumino-silicate and that the spatial concentration of these cations is dependent on the ordered internal structure of the specific alumino-silicate being treated.

It will be appreciated that the unique activity of the catalyst for promoting the Diels-Alder reaction is dependent not only on the nature and the concentration of the active sites found within its ordered internal structure, but also on the availability of the sites for contacting the compounds being reacted.

Because the unique activity of the alumino-silicate catalyst for effecting addition reactions is also dependent on the availability of the active sites, the defined pore size of an alumino-silicate is to be considered when preparing the catalyst of this invention. Generally, the alumino-silicate should have a pore size of at least 6.5 A. (as evidenced by its ability to sorb benzene to the extent of at least 4 percent by weight at 25° C. and 20 mm. partial pressure of benzene) so that it can accept the cyclic reactants and also permit egress of the cyclic adducts and the like from within its ordered internal structure. Preferably, in order to accommodate the multi-branched products of the larger molecular weight cyclic compounds, the pore size is from about 10 A. to about 13 A. in diameter. It will be appreciated that the pore size desired for the alumino-silicate catalysts will depend on the conjugated dienes and dienophiles being reacted as well as the Diels-Alder adducts being produced.

In addition, the stability and distribution of active cation sites formed within the alumino-silicate is also effected by the silicon to aluminum atomic ratio within its ordered internal structure. In an isomorphic series of crystalline alumino-silicates, the substitution of silicon for aluminum in the rigid framework of the lattice, results in a decrease of total cation sites as evidenced by elemental analysis and reduction of exchange capacity. Thus, among the faujasite isomorphs, the zeolite known as Y will have a sparser distribution of sites within the pores than the zeolite known as X. (These alumino-silicates are hereinafter described in greater detail.) It has been found that alumino-silicates having a high silicon to aluminum atomic ratio are more desirable for preparing certain catalysts of this invention. Preferably, the silicon to aluminum atomic ratio is at least 1.8. These catalysts are readily treated with solutions that contain hydrogen ions and are readily regenerable after having been used by contact at elevated temperatures with an oxygen containing stream at controlled conditions such that the carbonaceous residues may be efficiently removed without damage to the essential structure and properties of the catalyst.

Typical of the alumino-silicates employed in accordance with this invention, are several alumino-silicates, both natural and synthetic, which have a defined pore size of from 6.5 A. to 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$M_{2/n}:Al_2O_3:wSiO_2:yH_2O$$

wherein M is a cation which balances the electrovalence of the tetrahedra, n represents the valence of the cation, w the moles of $SiO_2$, and y the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials is the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

$$1.0 \pm 0.2 M_{2/n}:Al_2O_3:2.5 \pm 0.5 SiO_2:yH_2O$$

wherein M is a cation having a valence of not more than 3, n represents the valence of M, and y is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms. It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2 Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Another alumino-silicate material found to be active in the present addition process is a naturally occurring zeolite known as mordenite. This zeolite has an ordered crystalline structure having a ratio of silicon atoms to aluminum atoms of about 5 to 1. In its natural state it usually appears as a salt which may be represented by the following formula:

$$Na_8(AlO_2)_8(SiO_2)_{40}24H_2O$$

Mordenite has an ordered crystalline structure made up of chains of 5-membered rings of tetrahedra. The crystal has a system of parallel channels having free diameters larger than 6.5 A., interconnected by smaller channels, parallel to another axis, on the order of 2.8 A. free diameters. As a result of this different crystalline framework, mordenite in proper ionic forms, sorbs benzene and cyclic hydrocarbons. However, it cannot accept some of the larger molecules which will be sorbed by zeolite X and zeolite Y.

It will be appreciated that other alumino-slicates can be employed as catalysts for the various processes of this invention. A criterion for each catalyst is that its ordered internal structure must have defined pore sizes of sufficient diameters to allow entry of the preselected reactants and the emergence of the desired reaction products. Furthermore, the alumino-silicate advantageously should have ordered internal structure capable of chemisorbing or ionically bonding additional metals and/or hydrogen ions within its pore structure so that its catalytic activity may be altered for a particular reaction. Among the naturally occurring crystalline alumino-silicates which can be employed are faujasite, heulandite, clinoptilolite, mordenite and dachiardite.

The preferred alumino-silicate catalysts are those prepared from the class of zeolites comprising faujasite-like crystalline structures. In particular, the preferred catalyst for the reaction of reactive addends, such as maleic anhydride and butadiene, is characterized by a defined pore size of at least 10 A. in diameter within an ordered internal structure and is prepared from the sodium form of synthetic faujasite, e.g., zeolite X or Y. Another preferred catalyst is the rare earth exchanged zeolite X which has a high concentration of hydrogen sites. This catalyst is also prepared from the sodium form of zeolite X, as the result of a conventional treatment involving partial replacement of the sodium by contact with a fluid medium containing cations of at least one of the rare earth metals. Any medium which will ionize the cations without affecting the crystalline structure of the zeolite may be employed. After such treatment the resulting exchanged product is water washed, dried, and dehydrated. The dehydration thereby produces the characteristic system of open pores, passages or cavities of crystalline aluminosilicates.

As a result of the above treatment, the rare earth exchanged alumino-silicate is an activated crystalline catalyst material in which the molecular structure has been changed by having metallic rare earth cations and hydrogen cations chemisorbed or ionically bonded thereto. Furthermore, it will be appreciated that the defined pore size of the rare earth exchanged zeolite X may vary from above 6 A., generally from 6 A. to 15 A., and preferably in the approximate range of 10 A. to 13 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

It will be appreciated that zeolite X may also be base exchanged with the rare earth metal cations followed by additional exchange with a fluid medium containing hydrogen cations or a compound convertible to the hydrogen cation such as ammonium chloride. The resulting rare earth-hydrogen exchanged zeolite X will also serve as an effective acid catalyst material; one difference being that its concentration of hydrogen sites will be greater than the above-described zeolite X catalyst material.

It will also be appreciated that cations of polyvalent metals other than the rare earths may be employed to replace the exchangeable cations from the alumino-silicates to provide effective catalysts for this process; those having a valance of three or more being preferred. Exemplary of such metals are the lower valence metals silver, cobalt, nickel, zinc, and the higher valence metals vanadium, chromium, manganese, iron, and the like. However, the chemical properties of the metal, i.e., its atomic radius, degree of ionization, hydrolysis constant and the like, will determine its suitability for exchange with a particular alumino-silicate. In addition, certain divalent metals such as calcium, magnesium, and barium, may be used with ammonium chloride, or like ammonium compounds, to produce alumino-silicate catalysts for this invention by conventional base exchange techniques. The ammonium cations being decomposed to form hydrogen sites by heating of the exchanged alumino-silicate to drive off ammonia.

Other effective catalysts for producing Diels-Alder adducts from the more reactive addends can be prepared from zeolite Y. Thus, zeolite Y may be further activated by the same base exchange techniques employed for the rare earth exchanged zeolite X catalyst. It has been found that the exchange of rare earth metals for the sodium cation within zeolite Y produces a highly active catalyst. However, because of the high acid stability produced by a high silicon to aluminum ratio, the preferred acid form of zeolite Y is prepared by partially replacing the sodium cations with hydrogen cations. This replacement may be accomplished by treatment with a fluid medium containing hydrogen cations and/or cations capable of conversion to hydrogen cations. Inorganic and organic acids represent the source of hydrogen cations, whereas ammonium compounds are representative of the cations capable of conversion to hydrogen ions. It will be appreciated that the fluid medium may contain a hydrogen cation, an ammonium cation or a mixture thereof, in a pH range from about 1 to about 12.

Mordenite is activated to serve as a catalyst for the instant invention by replacement of the sodium cations with hydrogen cations. The necessary treatment is essentially the same as that described above for the preparation of the acid zeolite Y except that a mineral acid such as HCl is used as a source of hydrogen cations. In general, the mordenite is reduced to a fine powder (approximately passing a 200 mesh sieve and preferably passing 300 or 325 mesh sieves or finer) and then acid treated.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of those oxides with one another and with other components. Other suitable supports include activated charcoal, mullite, kieselguhr, bauxite, silicon carbide, sintered alumina and various clays. These supported crystalline alumino-silicates may feasibly be prepared as described in copending application of Albert B. Schwartz, Ser. No. 147,722 filed Oct. 26, 1961 by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminus or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–B, and IV–A of the Periodic Table. Such components include for example, silica-alumina, silica-magnesia, silica-zirconia, silica-thoria, silica-beryllia, silica,-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of $\frac{1}{16}''$ to $\frac{1}{8}''$ size, for example, obtained upon pelleting the alumino-silicate with a suitable binder such as clay. The zeolite X, described hereinabove, may be obtained on a clay-free basis or in the form of pellets in which clay is present as a binder.

Diels-Alder adducts may be produced by the process of this invention over a relatively wide range of operating conditions. In general, the process is conducted from about 0° to about 400° C.; preferably, the temperature is from 50° to 300° C. At the upper temperature range, the adducts and dienophiles will usually be in the liquid phase, and the dienes will be vaporized. It will be appreciated that some aromatic dienes such as anthracene have high boiling points, e.g., 340° C., and may therefore also be liquids at these conditions.

Operation at temperatures in the upper range or above in the presence of the alumino-silicate catalysts may cause polymerization of either the diene or dienophile reactants, especially in the absence of other reactants (e.g., hydrogen, water, hydrogen sulfide, carbon dioxide and the like) and/or other catalytic functions which tend to promote subsequent reactions (e.g., dehydrogenation) of the Diels-Alder adducts. For example, when a platinum metal is employed with an alumino-silicate catalyst during production of aromatic and cyclohexane products from the Diels-Alder adducts, the use of a hydrogen atmosphere at a low partial pressure and a relatively high temperature often prevents premature deactivation of the catalyst. Thus, it will be appreciated that temperatures up to about 600° C. may be required to effect some of the subsequent reactions heretofore described for production of certain derivative products from the Diels-Alder adducts.

At the lower temperatures, the process usually operates in the liquid phase depending on the melting points of the adducts and reactants. It will be appreciated that several compounds may be used or formed in the Diels-Alder reactions which are solid or heavy viscous liquids within this temperature range. Accordingly, it has been found that such compounds may be more effectively reacted and handled by employing an inert solvent reaction medium.

Several organic solvents may serve as reaction media for the present process. In general, these solvents should be capable of functioning under the operating conditions of the process without entering into the reaction or undergoing degradation. Exemplary of some of these solvents are dioxane, propionic acid, acetone, ether, nitrobenzene, chlorobenzene, benzene, toluene, xylene, petroleum ether, and the like. It will be appreciated that in addition to serving as reaction media, these solvents may also function as diluents for the reaction mixture. Thus, highly exothermic reactions may be controlled so that polymerization or other high temperature side reactions are minimized by the uniform dissipation of heat through the solvent medium. Also, some of these solvents such as nitrobenzene and benzene also facilitate subsequent reaction of the adducts (e.g., dehydrogenation) by taking up hydrogen or the like freed from the adduct.

Although the Diels-Alder reactions are equimolar reaction mechanisms in which one mole of conjugated diene condenses with one mole of the $\alpha,\beta$-unsaturated dienophile to form a cyclohexene compound, it has been found that the presence of an excess of either the conjugated diene or of the dienophile in certain reactions will effectively promote higher yields of the adducts. Because some dienophiles such as acids and acid chlorides tend to cause polymerization of the dienes, use of the diene in excess of equimolar proportions will serve to minimize the affects of the dienophile. Accordingly, the molar ratio between the diene and the dienophile generally is in the range of from about 0.5:1 to about 10:1 and preferably at least about 1.5:1. In addition, because Diels-Alder reactions tend to be reversible at higher temperatures, equilibrium conditions at these temperatures are usually unfavorable for the production of adducts from some polycyclic compounds. However, this problem may be reduced by using an excess of the dienophile and by lowering the temperatures.

This process may be conducted at about atmospheric or at superatmospheric pressures. Usually the pressure is autogenous because many of the Diels-Alder reactions are exothermic and are conducted in closed vessels. The reaction time required to effect the addition reactions of this process in the presence of the alumino-silicate catalyst has been materially reduced in comparison with the prior art processes. Reactions which generally require extended periods of time to complete, may now be completed within substantially shortened periods. It has been found that the acid catalysts contemplated by this invention are particularly effective for reducing the reaction time of such non-reactive systems.

It will be appreciated that because of the unique catalytic activity of the alumino-silicate, this process may operate under less severe conditions which promote improved yields of Diels-Alder adducts during relatively short reaction periods. Thus, the process may be readily conducted on a continuous basis without requiring undue shutdowns for catalyst replacement or regeneration. Multiple catalytic reactors may be arranged so as to allow regeneration of one of the catalysts by burning off the contaminants in a stream of air at temperatures of about 550° C., while the other catalyst is still on stream.

It will further be appreciated that the operating procedures and conditions employed by the present invention for the production of Diels-Alder adducts and/or derivatives thereof are dependent on the specific alumino-silicates being employed, the conjugated diene and the ethylenically or acetylenically unsaturated compound (dienophile) selected as reactants, and the solvent used for the reaction medium. In addition, such conditions as temperature, molar ratio between the diene and the dienophile, and time of reaction, will have significant affects on the resulting adduct products. The manner in which these conditions affect production of the Diels-Alder adducts, as contemplated by this invention, may be more readily understood from the following specific examples.

The following examples were conducted as continuous and batch-type processes in the presence of several of the alumino-silicate catalysts heretofore described for this invention. One of the alumino-silicate catalysts was the sodium form of zeolite X having a pore size of from about 10 A. to 13 A. in diameter. This material required substantially no additional treatment and was essentially the commercial molecular sieve material designated as Linde 13X. Another catalyst used was prepared from the Linde 13X by base exchange with a solution of rare earth chlorides as heretofore described. After such base exchange treatment, this alumino-silicate was washed of anions, dried and calcined in the conventional manner to provide the characteristic defined pore structure of the crystalline alumino-silicate.

The sodium form of zeolite Y was also utilized as a catalyst for the following examples. This catalyst also had a relatively large pore size of from 10 A. to 13 A. in diameter. Also, as heretofore described, hydrogen exchanged zeolite Y was prepared as a catalyst for these processes. Batch-type and continuous operations were also conducted in the presence of another acid alumino-silicate catalyst prepared from naturally occurring mordenite by base exchange with hydrogen cations. Furthermore, one example was also conducted in the presence of a composite catalyst prepared by incorporating the rare earth exchanged zeolite X in an inert matrix binder of silica-alumina gel. This composite catalyst contained approximately equal weight proportions of the zeolite X and the silica-alumina. In addition, to serve as a control, Pyrex glass beads or quartz chips were also utilized under similar conditions during some of the examples. Each of the above-described catalyst materials were in the form of solid particles having a particle size of from 100 to 200 mesh.

In several of the examples conducted as a batch-type operation, one of the alumino-silicate catalysts and the Pyrex glass beads were placed in two 500 cc. vessels having a thermometer in a sealed neck portion. Then the dienophile, i.e., acrolein, crotonic acid, or maleic anhydride, dissolved in a solvent diluent, was poured into each reaction vessel and intimately mixed with the alumino-silicate catalyst (and glass beads) by stirring. After such mixing, a measured portion of the conjugated diene (butadiene or furan) was introduced into the reaction vessels through the sealed neck portion. During the introduction, some of the reaction vessels were cooled in an ice chilled water bath; there being a noticeable rise in temperature. Then the temperature of the reaction mixtures were allowed to subside to a desired level. This reaction temperature was maintained by placing the reaction vessel in a pressurized, heated autoclave. The pressure in the autoclave was selected so as to equal the pressure within the reaction vessels. This was done by placing an amount of solvent within the autoclave so as to generate a pressure approximately equal to that within the reaction vessels.

After a period of about ninety minutes, the temperature of the autoclave was then reduced and the reaction vessels were allowed to cool to 100° C. Then the reaction mixtures were separated from the catalyst and the glass beads. The resulting adducts were separated from the solvents by fractional distillation or recrystallization. In some of these examples two reaction times were used to evaluate the effects of the alumino-silicates of this invention; one set of reaction vessels being maintained under reaction conditions longer than the others.

Several runs were conducted in a continuous manner in a tubular reactor containing a bed of the alumino-silicate catalyst. The reaction was wrapped with a resistance wire and insulated with asbestos tape and aluminum foil for providing heat to it. A variable transformer was used to regulate the heat input. The product stream was continuously collected during the duration of each run and then analyzed.

*Example I*

Ten grams of zeolite X catalyst and an equal amount of Pyrex glass beads were charged into two separate sets of reaction vessels. Then 100 grams of maleic anhydride dissolved in 250 mls. of benzene at 35° C. were introduced into the vessels. Eighty grams of butadiene were then passed into the reaction vessels. The temperatures of the reaction vessels were maintained at 60° C. in an autoclave for a period of 90 minutes. Then one set of reaction vessels was removed from the autoclave, the catalyst removed, and the adducts collected and analyzed. After 180 minutes the other set was removed and the yield of adducts determined. The reaction vessel containing the alumino-silicate catalyst showed yields of 80 percent and 93 percent for the 1,2,3,6-tetrahydrophthalic anhydride, whereas those containing the glass beads gave yields of 30 percent and 55 percent.

*Example II*

In this example the catalyst prepared from the zeolite Y was employed to effect reaction between acrolein and butadiene. As in the previous example, a control was run in the presence of Pyrex glass beads. The following procedure was followed to charge two reaction vessels, one containing 12 grams of zeolite Y, and the other, equal amounts of Pyrex glass beads. Seventy grams of acrolein dissolved in 200 mls. of toluene were charged into the reaction vessels. Then 80 mls. of butadiene were added to the vessels. The reaction temperatures were maintained at 50° C. for 30 minutes in the autoclave. At the end of this time the reactants were removed, the catalysts separated, and the contents analyzed. The resulting adduct of $\Delta^3$-tetrahydrobenzaldehyde was separated and collected. The reaction in the presence of the catalyst gave substantially greater yields than that produced in the presence of the glass beads; 89 percent and 59 percent, respectively.

Example III

Following the same procedure as outlined in Example II, 86 grams of crotonic acid dissolved in 250 mls. of xylene were introduced into two reaction vessels, one containing 10 grams of acid mordenite. Fifty-four grams of butadiene were then charged into each vessel. After a reaction period of 90 minutes at a temperature of 150° C., the catalysts were separated and resulting reaction mixture was collected and analyzed. The reaction mixture produced with the acid mordenite contained 110 grams of 6-methyl-$\Delta^3$-tetrahydrobenzoic acid. In the reaction vessel containing the glass beads, only 75 grams of the adduct were found.

Example IV

Following the same procedure described in Example II, 98 grams of maleic anhydride suspended in 250 mls. of ether were contacted with 68 grams of furan in the presence of 5 grams of the rare earth exchanged zeolite X. After a mild evolution of heat, the reaction mixture was allowed to stand at a temperature of 80° C. for 180 minutes to complete the reaction. The reaction vessels were removed from the autoclave and the addition products collected and separated as hard colorless crystals. Appreciably greater amounts of the 3,6-endoxo-1,2,3,6-tetrahydrophthalic anhydride were obtained in the presence of the catalyst of this invention; the yield of adduct being 95 percent with the catalyst, and 70 percent with the glass beads.

Example V

Using the same procedure and quantity of reactants employed in Example IV, 5 grams of the composite catalyst of rare earth exchanged zeolite X and silica-alumina gel were used to promote the Diels-Alder reaction. In this case, however, the yield of adduct was 82 percent. It will be appreciated that this decrease is in line with the reduced amount of rare earth exchanged zeolite X available in the reaction vessel.

Example VI

A batch-type operation was employed to react 90 parts by weight of isoprene and 100 parts by weight of maleic anhydride dissolved in 300 parts by weight of benzene. The reaction mixture was placed together with 10 grams of acid mordenite into an autoclave. The autoclave was then heated two hours at 50° C. Then the reactants were removed and filtered hot to remove the catalyst. On cooling to 0° C., 110 parts by weight of solid adduct material were separated and removed by filtration. Neutralization number and infrared spectra identified the adduct product as being 4-methyl-$\Delta^4$-tetrahydrophthalic anhydride. Another reaction was conducted under identical conditions but without the catalyst. This reaction produced only 70 parts by weight of the solid adduct.

Example VII

Reaction of butadiene with methyl vinylketone was effected in a tubular reactor at atmospheric pressure over a variety of alumino-silicate catalysts in a continuous process. In addition, a control run was conducted over quartz chips. All of the runs except one were conducted for one hour; this run being on stream for 30 minutes. The reaction temperatures during these runs ranged from 140° to 260° C. and the butadiene and methyl vinylketone were passed through the reactor at a LHSV ranging from 0.50 to 0.6. Samples taken at the end of each run were separated from the catalyst and analyzed. As shown by the following data, continuous operation in the presence of the alumino-silicates of this invention provides substantially improved yields of acetylcyclohexene.

| Catalyst | Temp., °C. | Time, hrs. | LHSV | Percent Conversion of Products | | |
|---|---|---|---|---|---|---|
| | | | | 4-acetyl-cyclo-hexene | Others | Total |
| (H+) Exchanged Mordenite | 175 | 1 | 0.50 | 13.33 | | 13.33 |
| Do | 250 | 1 | 0.50 | 25.77 | | 25.77 |
| Rare Earth Exchanged "13X" | 175 | 1 | 0.51 | 16.35 | 1.02 | 17.37 |
| Do | 240 | 1 | 0.51 | 18.16 | 0.65 | 18.81 |
| (H+) Exchanged Zeolite Y | 160 | 0.5 | 0.6 | 13.86 | 1.09 | 14.95 |
| Do | 250 | 1 | 0.6 | 21.47 | 3.30 | 24.77 |
| Sodium Zeolite Y | 165 | 1 | 0.5 | 2.25 | 0.24 | 2.49 |
| Do | 250 | 1 | 0.5 | 12.75 | 0.58 | 13.33 |
| Sodium Exchanged "13X" | 175 | 1 | 0.50 | 30.70 | 0.43 | 31.13 |
| Do | 260 | 1 | 0.51 | 8.17 | 24.63 | 32.80 |
| Quartz Chips | 175 | 1 | 0.50 | 2.51 | 10.44 | 12.95 |
| Do | 250 | 1 | 0.51 | 6.92 | 15.57 | 22.49 |

Inspection of the above continuous runs shows that the alumino-silicate catalysts exhibited significantly greater reaction selectivity for production of adducts than that shown by the control run using quartz chips. Under substantially identical reaction conditions, acid mordenite achieved more than five times the percent conversion produced by the control at 175° C. and more than three times that at 250° C. Furthermore, the alkali metal faujasites sodium Y and sodium 13X also showed greater selectivity for conversion to the desired adduct products. It will be appreciated that the increased proportion of other products produced with sodium 13X at 260° C. indicates the isomerization reactions that may be achieved at higher temperature with the alkali metal alumino-silicate catalysts.

Examination of the results obtained by the examples shows that the alumino-silicate catalysts had consistently high selectivity for producing Diels-Alder type adducts over variable reaction conditions and that the present process provides a high degree of control for determining the quantity and nature of the reaction products.

It will be appreciated from the above examples that the catalyst of this invention effectively promotes production of the Diels-Alder adducts and that substantially improved yields during reduced reaction times may be obtained by the process of this invention.

It will also be appreciated that the examples set forth above, as well as the foregoing specification, are merely illustrative of the different adducts which may be produced by this process and that additional Diels-Adler reactions followed by other desired reactions may be conducted in the presence of the alumino-silicates contemplated by this invention.

It will further be appreciated that other alumino-silicates may be employed as the catalysts for this process and that various modifications and alterations may be made in the process without departing from the spirit of the invention.

What is claimed is:

1. The process of claim 28 in which the reaction is effected from about atmospheric to superatmospheric pressures.

2. The process of claim 28 in which the reaction takes place in an inert solvent medium.

3. The process of claim 28 in which the molar ratio between the conjugated diene and the unsaturated carbonyl compound extends from about 0.5:1 to about 10:1.

4. The process of claim 28 in which said alumino-silicate catalyst contains metal cations selected from the group consisting of alkali metals and alkaline earth metals.

5. The process of claim 28 in which said alumino-silicate catalyst contains rare earth metal cations.

6. The process of claim 28 in which the crystalline alumino-silicate is a faujasite.

7. The process of claim 28 in which said alumino-silicate catalyst is a rare earth exchanged faujasite.

8. The process of claim 28 in which said alumino-silicate catalyst is acid mordenite.

9. The process of claim 28 in which the alumino-silicate catalyst is hydrogen exchanged zeolite Y.

10. The process of claim 28 in which the alumino-silicate catalyst is a composite catalyst of rare earth exchanged faujasite and a silica-alumina gel.

11. The process of claim 28 in which said alumino-silicate catalyst is contained in and distributed throughout a matrix binder.

12. A process for producing cyclic addition products which comprises reacting acrolein and butadiene at a temperature of from about 0° C. to about 400° C. in the presence of a catalyst consisting essentially of the sodium form of faujasite and recovering a product of $\Delta^3$-tetrahydrobenzaldehyde.

13. The process of claim 12 in which said reaction is conducted in a toluene reaction medium.

14. The process of claim 12 in which the molar ratio between the acrolein and butadiene is from about 1:1 to about 0.3:1.

15. A process for producing cyclic addition products which comprises reacting maleic anhydride and butadiene at a temperature of from about 0° C. to about 400° C. in the presence of a catalyst consisting essentially of the sodium form of faujasite and recovering a product of 1,2,3,6-tetrahydrophthalic anhydride.

16. The process of claim 15 in which said reaction is conducted in a benzene reaction medium.

17. The process of claim 15 in which the molar ratio between maleic anhydride and butadiene is from 1:1 to 0.3:1.

18. A process for producing cyclic addition products which comprises reacting crotonic acid and butadiene at a temperature from about 0° C. to about 400° C. in the presence of a catalyst consisting essentially of acid mordenite and recovering a product of 6-methyl-$\Delta^3$-tetrahydrobenzoic acid.

19. The process of claim 18 in which said reaction is conducted in a xylene reaction medium.

20. The process of claim 18 in which a molar ratio between crotonic acid and butadiene is from 1:1 to 0.3:1.

21. A process for producing cyclic addition products which comprises reacting maleic anhydride and furan at a temperature from about 0° C. to about 400° C. in the presence of a catalyst consisting essentially of a rare earth exchanged faujasite and recovering a product of 3,6-endoxo-1,2,3,6-tetrahydrophthalic anhydride.

22. The process of claim 21 in which said reaction is conducted in an ether reaction medium.

23. The process of claim 21 in which the molar ratio between maleic anhydride and furan is from about 1:1 to about 0.3:1.

24. The process for producing cyclic addition products which comprises reacting butadiene and methyl vinylketone in a continuous manner at a temperature from about 100° C. to about 400° C. in the presence of an aluminosilicate catalyst selected from the group consisting of a sodium form of faujasite, a hydrogen exchanged zeolite Y, and an acid mordenite and recovering a product of 4-acetylcyclohexene.

25. A process for producing cyclic addition products which comprises reacting isoprene and maleic anhydride at a temperature from about 0° C. to about 400° C. in the presence of acid mordenite and recovering a product of 4-methyl-$\Delta^4$-tetrahydrophthalic anhydride.

26. The process of claim 25 in which said reaction is conducted in a benzene reaction medium.

27. The process of claim 25 in which the molar ratio between maleic anhydride and isoprene is from about 1:1 to 0.3:1.

28. A process for producing cyclic additional products which comprises reacting a conjugated aliphatic diene containing from 4 to 20 carbon atoms and an $\alpha,\beta$-ethylenically unsaturated carbonyl compound selected from the group consisting of acids, anhydrides, ketones and aldehydes containing from 3 to 15 carbon atoms at a temperature from about 0° C. to about 600° C. in the presence of a catalyst comprising a crystalline alumino-silicate having active cation sites within an ordered internal structure, said ordered internal structure having a defined pore size of at least 6 A., and recovering the reaction products from said catalyst.

References Cited
UNITED STATES PATENTS 1,944,731   1/1964   Diels et al. _____ 260—346.6

NICHOLAS S. RIZZO, *Primary Examiner.*

UNITED STATES PATENT OFFICE
CERTIFICATE OF CORRECTION

Patent No. 3,359,285                                December 19, 1967

Phillip S. Landis

It is hereby certified that error appears in the above numbered patent requiring correction and that the said Letters Patent should read as corrected below.

Column 2, lines 67 to 71, for that portion of the formula reading "$R'_4$" read -- $R'_2$ --; column 6, line 31, for "$M_{2/n}$" read -- $M_{2/n}O$ --; column 9, line 37, for "aluminus" read -- aluminous --.

Signed and sealed this 21st day of January 1969.

(SEAL)
Attest:

Edward M. Fletcher, Jr.                                     EDWARD J. BRENNER
Attesting Officer                                                Commissioner of Patents